United States Patent [19]

Gibson, III

[11] 4,383,307

[45] May 10, 1983

[54] SPELLING ERROR DETECTOR APPARATUS AND METHODS

[75] Inventor: Stuart M. Gibson, III, Pound Ridge, N.Y.

[73] Assignee: Software Concepts, Inc., Stamford, Conn.

[21] Appl. No.: 259,998

[22] Filed: May 4, 1981

[51] Int. Cl.³ ............................................. G06F 7/22
[52] U.S. Cl. .................................. 364/900; 364/419; 382/40
[58] Field of Search .................. 178/69 G, 23 A; 235/310; 340/347 DD, 146.3 WD, 146.3 ED, 715; 364/200 MS File, 900 MS File, 419; 369/83

[56] References Cited

U.S. PATENT DOCUMENTS

| | | | |
|---|---|---|---|
| 3,439,341 | 4/1969 | Dolby et al. | 364/900 |
| 3,537,076 | 10/1970 | Damerau | 364/900 |
| 3,689,915 | 9/1972 | De Clerck et al. | 235/310 |
| 3,925,761 | 12/1975 | Chaires et al. | 340/146.3 WD |
| 3,969,700 | 7/1976 | Bollinger et al. | 340/146.3 WD |
| 3,995,254 | 11/1976 | Rosenbaum | 340/146.3 WD |
| 4,010,445 | 3/1977 | Hoshino | 340/146.3 WD |
| 4,028,677 | 6/1977 | Rosenbaum | 364/900 |
| 4,041,467 | 8/1977 | Cota et al. | 364/900 |
| 4,054,948 | 10/1977 | Grier et al. | 364/900 |
| 4,136,395 | 1/1979 | Kolpek et al. | 340/146.3 WD |
| 4,223,393 | 9/1980 | Abe et al. | 364/900 |
| 4,244,031 | 1/1981 | Izushima et al. | 364/900 |

Primary Examiner—Mark E. Nusbaum
Assistant Examiner—William G. Niessen
Attorney, Agent, or Firm—Arthur L. Plevy

[57] ABSTRACT

A spelling error detector apparatus employs a memory which stores alphabetical words as those existing in the English language in three major memory sections which constitutes a most frequently used word list (MFU), a master word list (MWL) and a personal word list (PWL). Each word is uniquely coded and stored as a 24 bit binary number. The system then retrieves words which are stored or entered into a processor memory and which words are indicative of a document to be printed. Each word emanating from the processor memory is converted into the same code as the stored words and then a search is made to determine whether the processor word compares with a word as stored. If a favorable comparison is had, it is assumed that the spelling of the processor word is correct. If an unfavorable comparison is had, it is assumed that the spelling is incorrect and the misspelled word is stored in a separate memory which can be accessed by the operator in order to make the necessary corrections. Similarly each word which is correctly spelled is also stored in a memory which has the capacity to store a plurality of the last words checked by the system. Based on the system considerations the coding of the words assures a very low collision rate and hence the system is extremely reliable in detecting misspelled words according to the disclosed techniques.

22 Claims, 5 Drawing Figures

SPELLING ERROR DETECTOR APPARATUS AND METHODS

BACKGROUND OF INVENTION

This invention relates to apparatus for detecting misspelled words in electronically stored documents and more particularly relates to a spelling error detector and methods of operation.

In modern technology there are many devices which store documents electronically and when accessed will create a printed image of the stored data. As such, these devices include word processors.

The word processor is a machine on which a printed image can be corrected and manipulated before it is printed out in final form. The word processor uses computer technology to operate with words. There are of course many other types of systems which essentially store data in the form of words and subsequently can print out the data. These systems include data processing computers and so on.

Modern word processors utilize four basic elements which are a visual display unit and an input keyboard, a memory, a text storage media and a printer. The combination of a typewriter keyboard and the visual display unit is generally referred to as the Work station. The display enables the operator or typist to see the text before it is finally printed. Displays vary from single line displays to full page displays. As indicated, every word processor has an internal memory unit where the text or words are stored and manipulated. The space available in the word processor memory for the text is normally not very large and in most word processors the memory can only hold one or two pages of text. Hence in more sophisticated units, additional pages of text are transferred into a remote memory designated as a text storage media. This additional memory usually consists of a cassette tape, a floppy disk or diskette.

Essentially, the most common device employed is a diskette or floppy disk and this memory device can hold between 80 to 160 typical pages of text. Of course new developments are continuously being made and there exists hard disk memories which permit higher storage levels and faster access times. In any event, there is need in conjunction with such equipments to detect misspelled words in documents which are stored as above described.

In using conventional techniques, small computer systems as well as word processors do not have sufficient storage capacity nor processing power to check the spelling of the stored words. There are large expensive, typesetting machines which typically use a 20 to 80 million character mass storage device to actually store an abridged dictionary. These machines use well-known indexing methods to check spelling of stored documents. However, small computers and word processors only have one hundred thousand to two million characters of storage and hence, this memory is not enough to hold a sizable dictionary.

More importantly is the fact that a small computer or word processor cannot search through long word lists in a reasonable period of time and hence, to check spellings by prior art techniques will be extremely time consuming.

In the prior art, one system employed in conjunction with a small computer attempts to solve the problem by dividing words in to lists of prefixes, suffixes and word roots. The time to locate a word root is rather small, therefore the search operation is relatively rapid. However, these techniques do not permit automatic hyphenation and also allow certain invalid words to appear as correctly spelled. For example, a word such as "perfix" is considered to be a correct spelling since "per" is a valid prefix, and "fix" is a valid root. It is therefore an object of the present invention to provide apparatus for use with processing systems and general purpose computers which apparatus will quickly and rapidly isolate misspelled words in electronically stored documents.

It is a further object to provide such apparatus to enable documents which are electronically stored to be hyphenated automatically.

BRIEF DESCRIPTION OF THE PREFERRED EMBODIMENT

A spelling error detector apparatus is employed for use in conjunction with a word processor and is capable of detecting spelling errors in alphabetical words which are stored in a memory associated with the word processor and indicative of a document to be printed. The system comprises means for retrieving each word stored and for converting the stored word into a binary word having a given number of bits, format means rotate a selected number of bits of said word to provide a new word indicative of a code for the stored word, a memory has stored therein a plurality of words which have been coded according to said format. These words are compared with said new word and if a favorable comparison is had, it manifests a correct spelling. If an unfavorable comparison is had, it manifests an incorrect spelling. Selected words of the English language, for example, are converted to a unique code by means of the above format to assure an extremely reliable and accurate detection system so that misspelled words will not be confused with other misspelled words.

DETAILED DESCRIPTION OF THE FIGURES

Figure 1:
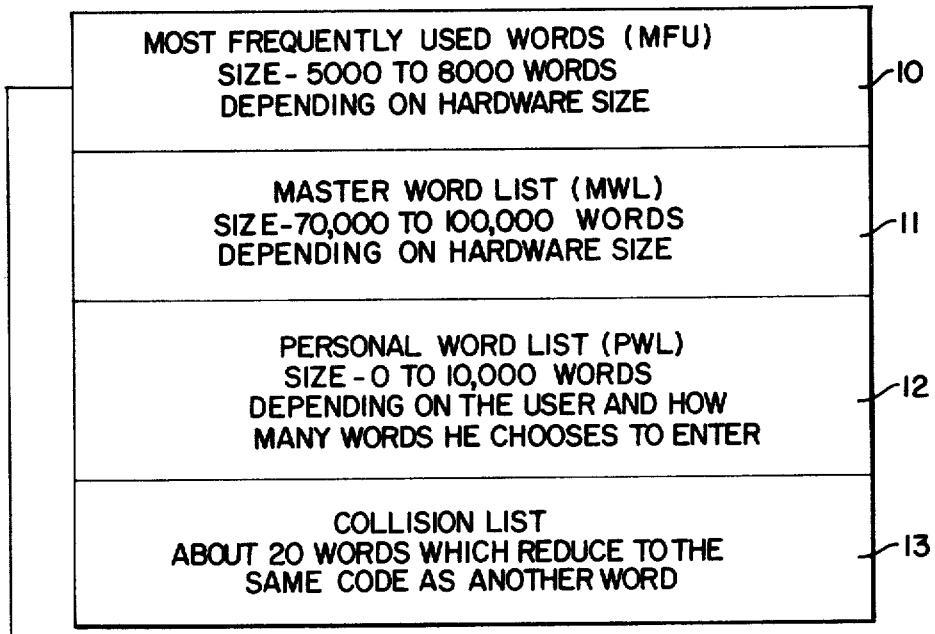
FIG. 1 is a diagrammatic view depicting a memory format according to this invention.
Figure 1:
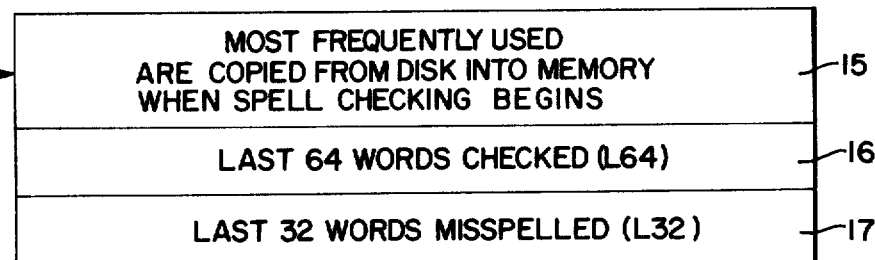

Referring to FIG. 1, there is shown a storage arrangement which comprises the electronic storage of a dictionary employed in this invention.

As seen from FIG. 1 the dictionary according to this invention consists of four parts. A first storage section 10 is designated as most frequently used words (MFU). This list consists of the 6,500 most frequently used words in the English language. Essentially, the word list exists in many abridged dictionaries and can vary between 5,000 to 8,000 words depending on the size of the hardware used.

As will be explained, the four part dictionary to be described is stored on a floppy disk. The next section of the disk 11 is a master word list (MWL). This list consists of 70,000 to 100,000 English words and geographical names. The master list is also obtained from a dictionary of a larger size and is also stored on the same floppy disk. A third list is designated as a personal word list (PWL). This list consists of each individual users particular additions to the dictionary. For example, the PWL will contain names of company executives, the company name, technical words such as electronic, chemical or other terms which are used in that particular industry. Storage is reserved for the PWL from 0 to 10,000 words depending upon the user and how many words a particular user desires to include in the PWL. There is also a fourth storage section 13 designated as a collision list. This list resolves the conflicts between the words and codes.

As will be explained, in order to accurately and reliably check spellings one must convert each word of the English language to a digital number or a digital word and then compare the typed words as stored with the digital numbers indicative of the correct spelling as stored in the memory.

In order to avoid multiple errors the code used must provide a minimum number of conflicts. As will be explained, if this number is extremely small then most words will be correctly detected. In the system to be described, the collision list 13 stores about twenty words which are capable of being reduced to the same code as another word.

All four parts of the memory as the MFU 10, the MWL 11, the PWL 12 and the collision list 13 are used together during the spelling check operation. The MFU 10 accomplishes high speed checking. The MWL 11 has enough memory capacity to insure that most of the English language is included. The PWL 12 tailors the dictionary to the end-user's own environment by accepting unusual words common to a profession such as legal or technical terminology. These words are of course added to the memory by the user who formulates the PWL 12. The collision list 13 contains the pair of words that reduce to the same code. As will be explained, the system to be described uses a unique method of operating on the English language so that the number of words in the collision list is small. As will be explained, the collision list 13 is essential in order to allow the system to provide automatic hyphenation.

As will be explained, in operation of the system the most frequently used words from the MFU 10 are transferred into the word processor memory when a spelling check sequence begins. This is designated by numeral 15 of FIG. 1.

The word processor memory also contains a storage area 16 which stores the last 64 words that are checked (L 64). Another area of storage contains a list 17 of the last 32 words which were misspelled.

In order to explain operation, a few brief comments will be given in regard to system conditions. An extremely important aspect of the system is the technique employed in organizing the word list within the memory. In this system words are grouped by the number of letters in the word. When the system reads the word from a document or from a memory it knows instantly how long the word is. Thus, in this system, if the word to be checked contains nine letters, the system will only check nine letter words. This indexing structure reduces the number of words to be searched by at least 90%. Further refinements include alphabetic arrangement within word length groups and an "s" allowed switch. With the latter, words that form their plural or present participle with the addition of a single "s" occur once in a word list (example: sit(s), game(s)).

In order to increase system speed, the apparatus uses two small word lists which are maintained in the high speed memory during a spelling check of a document.

As shown in FIG. 1, list 16 contains the last 64 words checked. This is important as research has shown that unusual or infrequently used words are often repeated in the same paragraph and hence list 16 allows one to rapidly check such words without going through the entire memories 10 to 13.

Memory 17 maintains a list of the last 32 misspelled words. This list is necessary as misspelled words are usually misspelled again. Hence, by providing storage in the high speed memory as 16 and 17, one can achieve a rapid spelling check system to be used with word processors or small computers.

In most word processors the input output and storage functions are provided in the ASCII code. This code is also sometime referred to as the USASCII. The code is a standard code for information exchange as specified by the USA Standards Institute. Examples of the code are well-known and for example, reference can be had to a text entitled "Reference Data for Radio Engineers" published by Howard W. Sams & Co. (1977), pages 35–45 and 40–25. Hence, in order to operate, each word which is stored in the memory has to be converted so that it can be compared and employed using a minimum number of errors. In this system each letter of a word is translated from the ASCII code to a binary number having a 24 bit value. For example, in the ASCII code, the letter "A" is designated as 41, B–42, C–43 . . . Z–5A which are equivalent to HEX 01, 02, 03 . . . 1A. Each letter is translated to a 24 bit binary value. For example, the letter "A" is 0000 0001, the letter "B" is 0000 0010 and so on.

After translating a letter, a 24 bit value, starting at zero the translated letter is rotated 5 bits to the left and then the translated letter is added to the rotated 24 bit value (exception: 6 letter word use a 7 bit rotate). This is done for each letter in the word and the resulting binary term is the code for that word. Let us give the following examples. Assume that the word to be translated is APPLE 1. Change all letters to upper case, then translate:
A=1 HEX
P=10 HEX
P=10 HEX
L=OC HEX
E=O5 HEX 2. Rotate the 24 bit value
00 00 00 (the first time, it stays 0)

3. Add the "A" or 01 HEX
00 00 01

4. Rotate (rotate 5 bits since it is a 5 letter word)
00 00 20

5. Add the "P" or 10 HEX
00 00 30

6. Rotate
00 06 00

7. Add another "P" (10 HEX)
00 06 10

8. Rotate
00 C2 00

9. Add the "L" (OC HEX)
60 C2 0C

10. Rotate
18 41 80

11. Add the "E"
18 41 85

Therefore, the word APPLE is stored as 18 41 85. This then is the code for the word APPLE.

Figure 2:
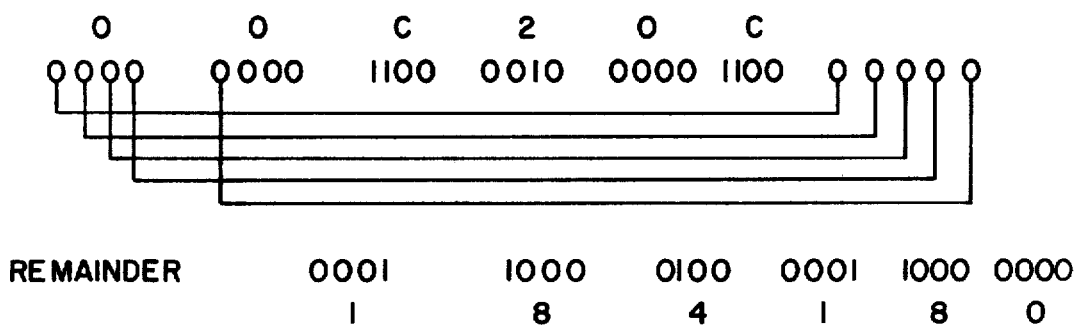
FIG. 2 is a diagram showing an operation performed on a word according to this invention.

Referring to FIG. 2, there is shown a schematic diagram depicting the rotation performed by the system in Step 9 to Step 10 to give one a clear understanding of exactly how the code for each word is formed. Thus, as shown in Step 9, after adding the "L", one obtains the binary number 00 C2 0C which is shown in FIG. 2.

Now, because the word APPLE is a 5 letter word, 5 bits are rotated. FIG. 2 shows the rotation of the first 5 bits and the sequence of rotation. Hence, the new word starts from the 6 bit which is a 0 to form the remainder also shown in FIG. 2 which is the number 18 41 80. The process continues for longer words until each letter has been added to the 24 bit rotating value. Hence, the entire word list is converted by this process to yield, for example, 70,000 codes of 24 bits each which codes represent the MWL 11. The codes are stored on a floppy disk as shown in FIG. 3.

Figure 3:
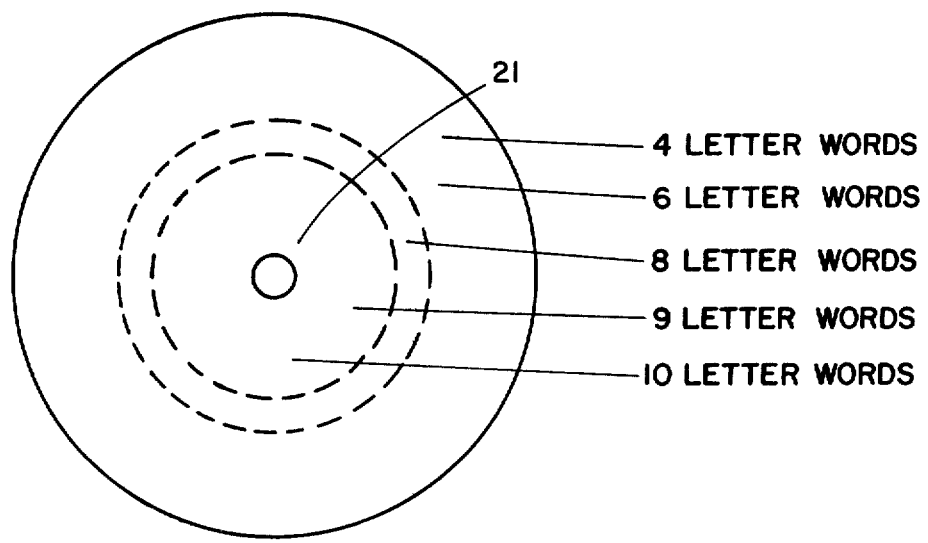
FIG. 3 is a top plan view of a disk showing word storage.

FIG. 3 is a schematic of a floppy disk 30 having a central aperture 21. In this storage system, the most common word length group which are words consisting of 8 letters are stored in the center of the disk. This positioning enhances access and hence increases system speed. The 8 letter word group is surrounded by a less frequently occuring word length group such as 7 letters, 6 letters above; 9 letters, 10 letters and so on below. Within each word length group, the 24 bit codes are arranged in ascending numerical order. Hence, the system can use a normal binary search technique to determine the presence or absence of any word.

In the system to be described, words are selected from a given document in the sequence that they occur in that document. Each word is converted to all capital letters and then translated into a series of HEX values with "A" represented by 1 and "Z" represented by 1A (or 26 decimal).

The above noted sequence is applied to each word to obtain a 24 bit code. The coded word is then looked-up in the MFU list 10, then in the two internal lists 16 and 17. The next check is on the MWL 11. The length of the word is determined and the system accesses the appropriate section of the disk 10 to perform a binary search for a matching 24 bit code. If the match is not found in any of the above memories, then a search is made in the PWL 12. The search ends when a match is found. If a match is not found it is assumed that a word is misspelled and this word is added to the output file of misspelled words and also stored in memory 17.

Depending upon the syntax of a particular word processing system, the operator can use the output file to locate and correct misspellings. Hence, the system will determine whether or not a word is misspelled and leave it to the operator to correct the spelling as necessary. The MWL 11 in addition to the 24 bit code uses several other codes to indicate preferred hyphenation points. The word processor may pass to the system a word and if the word is spelled correctly, the system has the capacity of sending back to the word processor hyphenation points. This hyphenation capacity is an optional feature. Hyphenation points are in the form of a series of numbers that designate the number of letters to the next hyphenation point. For example, the word HISTORY would be followed by a 3 and a 2. That would mean a hyphen is allowed after a third letter (reading left to right) and after the next two letters as HIS-TO-RY. This feature is used to automatically hyphenate a document during a repagination or a print operation.

Figure 4A:
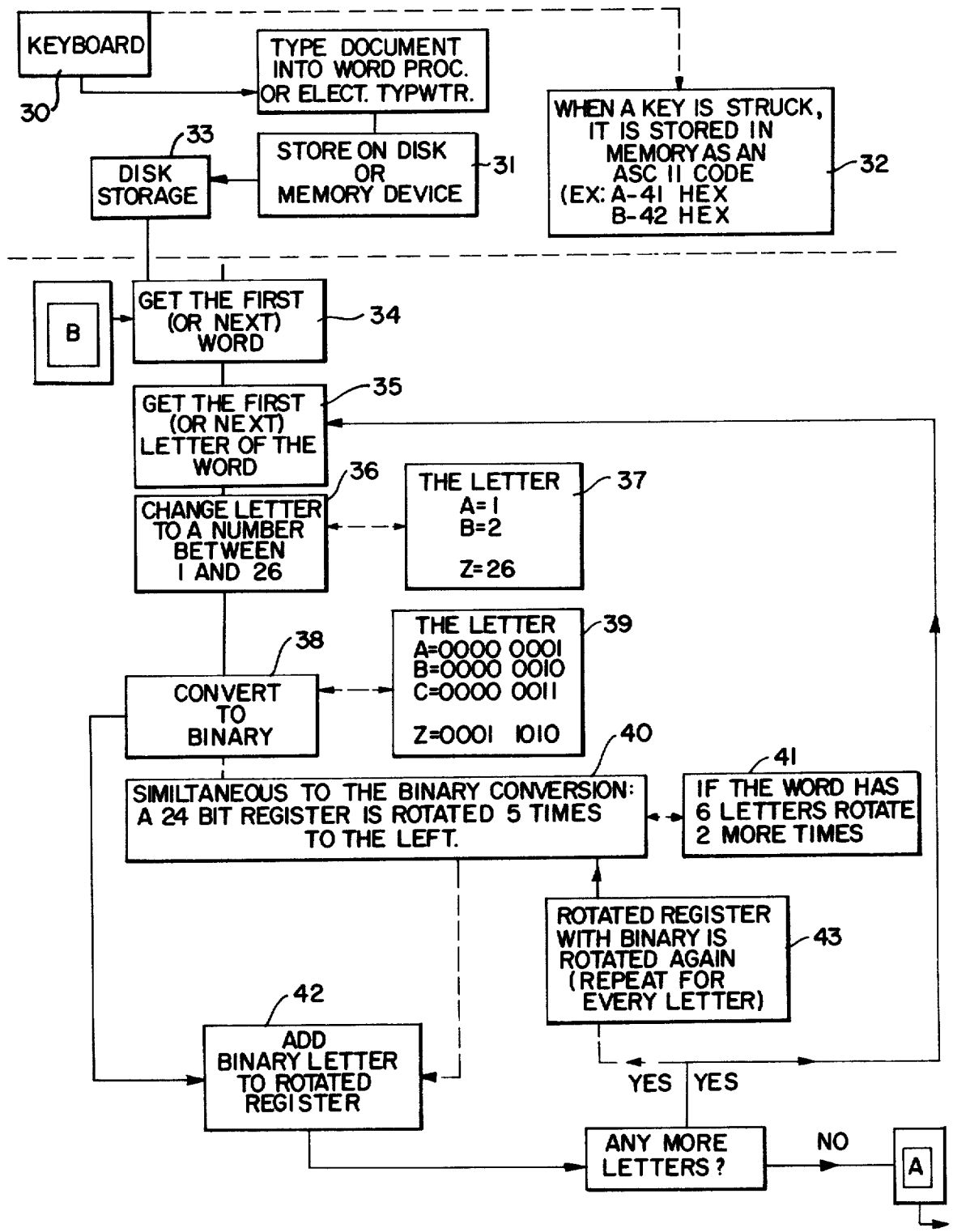
FIGS. 4a and 4b are detailed block diagrams and flow charts describing operation of the system.
Figure 4B:
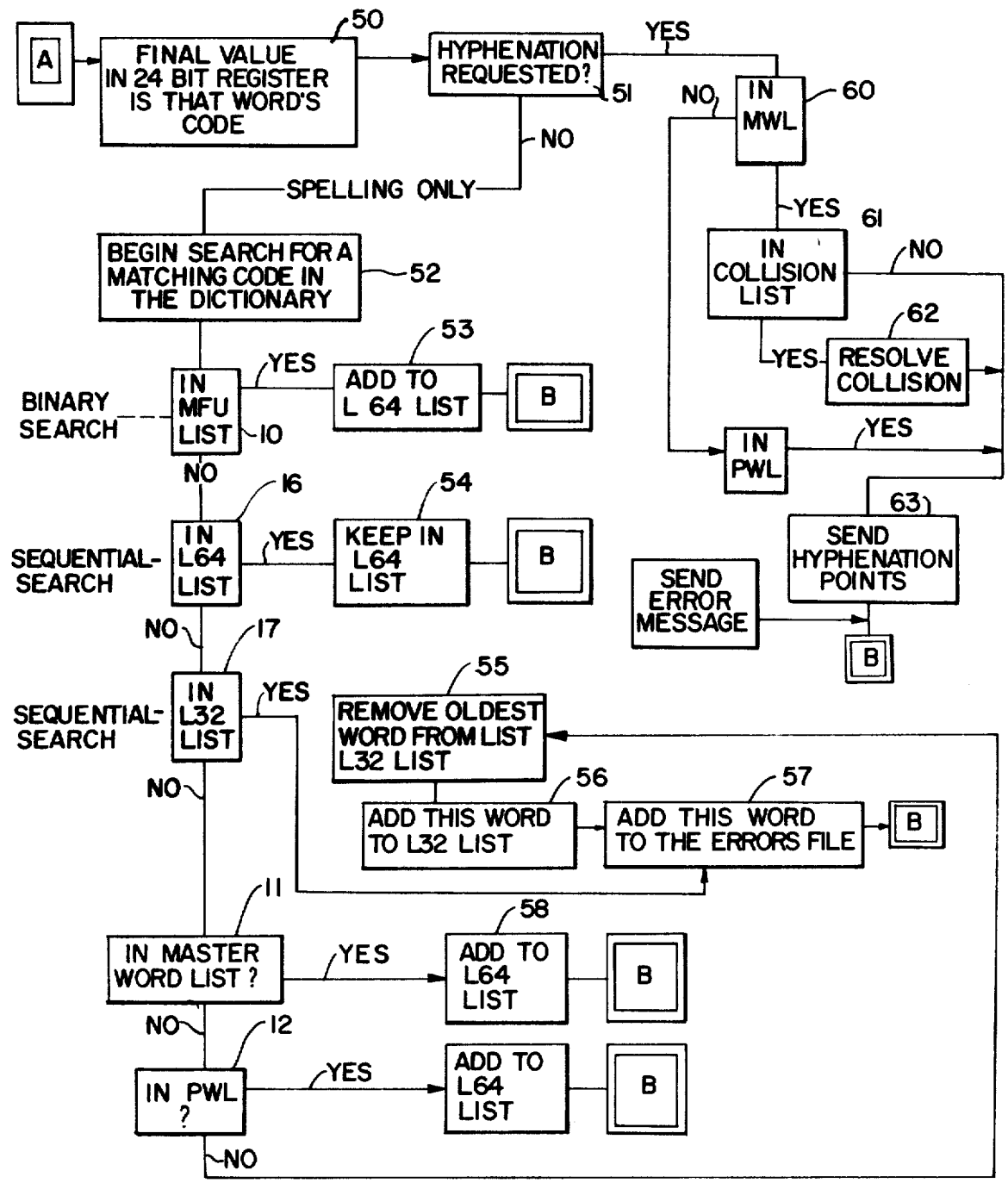

Referring to FIG. 4, there is shown a schematic diagram of a spelling error detector apparatus according to this invention and which apparatus operates with the memories and codes described above in conjunction with FIGS. 1, 2 & 3. Numeral 30 references a keyboard which is a conventional keyboard associated with a word processor or small computer. Keyboards as 30 are known in the art and many examples exists in word processors, as well as conventional typewriters. As the keyboard is accessed, the document is typed and each letter is stored in a disk or memory device 31 associated with the word processor. Examples of suitable devices as 31 are well-known in the art, as well as techniques for storing data therein. Each time a key is struck it is stored in the memory as an ASCII code which is depicted in module 32 for a clearer understanding. It is of course understood that the majority of word processors do exactly this as is known in the art.

The memory 33 of the word processor may be a disk storage or other device which in turn stores each letter of every word contained in the document. The first sequence of operation that the system performs is to retrieve the first word from the storage 33. Hence, module 34 is an address register which is sequentially operated to retrieve each word and letters stored in the disk storage device 33. Module 34 is a conventional digital logic circuit which will access the disk storage memory to retrieve any given word. The word retrieved is stored in module 34 in a register and the first letter of the word is accessed and transferred to register 35. This letter is converted to a number between 1 and 26 as indicated above. Hence, letter A=1 and so on as described in module 37.

The letter is converted to a binary number in module 38. The conversion of any code to a binary code is well-known in the art and hence, each letter is converted as shown in module 38 so that it is represented by the proper binary value. Simultaneous to the binary conversion, a 24 bit register 40 is rotated 5 times to the left. If the word has 6 letters it is rotated 2 times more as shown in module 41. Thus, the registers depicted in 40 and 41 employ conventional techniques. The converted letter is then added to the contents of the binary register in module 42 which module is a conventional digital adder. The rotation as given in the above example is repeated for each letter in a word as depicted in module 41. If all letters have been rotated, the system automatically retrieves the first letter of the next word and the process continues for the next word. Until each letter is added and rotated for a word, the sequence is repeated as explained above until the word is converted to the system code. The final value of the rotated word is stored in a 24 bit register 50. If hyphenation is requested the operator will press a key which will activate a flip flop 51. If hyphenation is not requested then a spelling check for that word is made.

Let us first assume that hyphenation is not requested. Thus, the system implements a search of the memories as indicated in module 52. The first memory accessed is the MFU memory 10. The memory is accessed by means of a binary search. The 24 bit word is then compared with the 24 bit word stored in the MFU list. The binary search starts from the center of the list and the word in register 50 is compared with the binary value of the center word. If it is higher, then the search commences from the center word to larger binary numbers. If it is lower, then the search commences from the center to the lower binary numbers. If the word is found in the MFU list it is stored in the last 64 word list 16 as indicated in module 53. If the word is not found in the MFU list 10 then a sequential search is made of the 64 word list 16. A sequential search is not a binary search but essentially the 24 word bit is compared with each of the 64 words stored in list 16 in sequence. If the word is found in list 16, it is retained therein as indicated by module 54. If the word is not found in memory list 16, a search of memory 17 is accomodated in sequence. Memory 17 contains the list of the last 32 misspelled words. If the word is not found in memory 17, therefore, it is not necessarily misspelled and is not added to the error file 57 at this time. It is understood that if the word is found in List 17, it is a misspelled word and, therefore, added to the word error File 57.

The word error file 57 may be a conventional memory such as a disk, cassette and so on or may be part of the word processor memory. In any event, if the stored word is not found in memory 17, the master word list or MWL memory 11 is accessed in a binary search. Hence, the 24 bit word is again checked with the 70,000 words in MWL 11. If it is found in MWL 11, it is added to memory 16 as indicated by module 58. If it is not found in MWL 11, a search of the personal word list 12 is made. If it is in the personal word list 12, it is again added to memory 16. If it is not in the personal word list then it is assumed that it is misspelled. This word is then inserted into memory 17 and therefore designated as a misspelled word.

As one can ascertain, each time a correct word is accessed, it is added to memory 16 as a last check word and the process begins anew and the next word is retrieved from the disk storage 33 via memory 34 until each word in the document has been verified.

Referring back to the diagram, if hyphenation is requested, a search of the MWL 11 is made via module 60. As indicated, hyphenation points are stored in MWL 11 and the PWL 12 by numbers which follow the word. If the word is found in the MWL 11, it is compared with the words stored in the collision list memory 13. This is done in module 61 to avoid hyphenating a word which may be improper. If the word is in the collision list 61, this will be indicated to the operator via module 62. The operator will then resolve the collision by correcting the spelling via the word processor. If this is done, the system will then send the hyphenation points as shown in module 63.

Thus, as shown above, the system described can compare any stored word with 24 bit words as stored in the above described memories to determine whether or not the word may be misspelled. Based on the above described code it has been determined that the system provides a collision rate of less than 0.025%. For example, in every 4,000 misspelled words which are detected by the system, only one word will be reduced to the same code as another misspelled word. Due to the organization of the system, a word search is rapidly performed as the system reserves the longest search, for example, the search of the MWL as the last search.

As one can ascertain from the above described description, the entire system can be simply implemented by conventional integrated circuit logic and conventional memory elements. These components are readily available and one skilled in the art will have no difficulty in implementing the system described. It is also understood that the entire system can be programmed by using a conventional microprocessor. The flow chart depicted in FIG. 4 can be implemented with a microprocessor. The minimum requirements are a 64K memory, two floppy disk drives like one for the dictionary and one for the document, a video display terminal and a central processing unit such as the Z-80 microprocessor. The system provides the operator with an indication of all misspelled words within a document and the entire content of memory 17 or the error file memory can be displayed for each document. In this manner, the operator employs the system to automatically check spelling and can therefore correct spelling errors before the document is finally printed out. This of course saves a great deal of time and effort and substantially enhances the capability of the word processor.

Many alternate techniques and modifications will become apparent to those skilled in the art upon reading the above specification and all such modifications are deemed to be encompassed within the spirit and scope of the following claims.

I claim:

1. A spelling error detector apparatus for use in detecting spelling errors in alphabetical words stored in a test memory associated with a word processor and indicative of a document to be printed from the stored words, comprising:

a code storage memory having stored therein a plurality of digital codes, each code derived from a separate alphabetical word by first translating all letters in said word to a first digital code, then forming an all zero digital word of a given number of fixed bits, then adding the first code of the first letter to said digital word and then rotating said added word a given number of bits and then adding the first code of the second letter to said rotated word and continuing said rotation and addition for all letters in said word to form said code as stored in said memory, means for retrieving a word as stored in said text memory associated with said processor, means for converting said retrieved word into a code according to said code as stored in said code storage memory including means for translating each letter of said stored word into a first digital code; register means for forming an all zero digital word and adding means for adding said first digital code of said first letter of said retrieved word to said all zero word and means for rotating said added word said given number of bits and then adding said first digital code of said second letter to said rotated word and means for continuing said rotation and addition for all letters in said retrieved word to form a code indicative of said stored codes, means for comparing said code formed as indicative of said retrieved word with said stored codes with a favorable comparison manifesting a correct spelling and with an unfavorable comparison manifesting an incorrect spelling.

2. The spelling error detector according to claim 1 wherein said storage code memory comprises, a first storage section for storing therein said codes indicative of most frequently used alphabetical words a second storage section for storing therein said codes indicative of a master word list indicative of a majority of other alphabetical words a third storage section for storing therein said codes indicative of a personal word list peculiar to a particular field.

3. The spelling error detector according to claim 1 further including;
first misspelled storage means responsive to said unfavorable comparison for storing therein said new word code upon an unfavorable comparison.

4. The spelling error detector according to claim 1 further including,
second properly spelled storage means responsive to said favorable comparison for storing therein said new word code upon a favorable comparison.

5. The spelling error detector according to claim 1 wherein each word is coded is represented by 24 binary bits.

6. The spelling error detector according to claim 2 wherein said first storage location is capable of storing between 5000 to 8000 words.

7. The spelling error detector according to claim 2 wherein said second storage location is capable of storing between 700,000 to 100,000 words.

8. The spelling error detector according to claim 2 wherein said third storage location is capable of storing between 1 to 10,000 words.

9. The spelling error detector according to claim 3 wherein said misspelled storage means is capable of storing at least 32 words.

10. The spelling error detector according to claim 4 wherein said second properly spelled storage means is capable of storing at least 64 words.

11. The spelling error detector according to claim 1 wherein said code storage memory is a disk memory.

12. A method of coding alphabetical words of a given number of letters into digital words for storage in a memory for use in a misspelled word detector apparatus for providing a list of stored words each having a unique code for providing a low collision rate for said misspelled detector apparatus comprising the steps of:
converting each letter of said word into a binary code having a given number of bits,
forming an all zero binary word of a given bit length, adding the binary code of said first letter to said formed word to form a new word,
rotating a given number of bits of said new word to form a rotated word,
adding the binary code of the second letter to said rotated word to form a new word,
rotating said new word, said given number of bits to form a new rotated word,
adding the next binary code of the next letter to said new rotated word, and repeating said steps of adding and rotating until all the letters of said word are used,
storing said final obtained word as a code uniquely indicative of said alphabetical word, and then
comparing said stored final obtained word code with similarly coded and stored alphabetical words indicative of a document to be printed in a misspelled word detector apparatus to detect a possible misspelling of said indicative alphabetical words.

13. The method according to claim 12 wherein said binary code is an ASCII code.

14. The method according to claim 12 wherein said word of a given bit length is 24 bits.

15. The method according to claim 14 wherein six letter words are rotated to the left using 7 bits.

16. The method according to claim 14 wherein all other letter words are rotated to the left using 5 bits.

17. The method according to claim 12 wherein the step of storing is storing said code on a floppy disk.

18. The method according to claim 17 wherein most common alphabetical length words as words having eight letters are stored on said disk as coded via said code in a concentric annular area located midway between the center and the outside edge of said disk with smaller length words stored in a concentric outer area and longer length words stored in a concentric inner area.

19. The method according to claim 18 wherein said most common alphabetical length words are 8 letter words.

20. The method of coding according to claim 12 further comprising the steps of:
Placing an arbitrary alphabetical word into a storage location,
converting each letter of said word into a binary code and thereafter performing the steps of claim 13 to form a new arbitrary coded word,
comparing the code of said new word with the codes of all final stored words to find a match indicative of a correct spelling.

21. The method of coding according to claim 20 further including the step of:
indicating when all final stored words do not compare with said arbitrary new word indicative of a misspelled word.

22. The method of coding according to claim 21 further including the step of storing said code indicative of said misspelled word in a separate memory.

* * * * *